United States Patent [19]
Sato et al.

[11] Patent Number: 5,672,425
[45] Date of Patent: Sep. 30, 1997

[54] MAGNETIC RECORDING MEDIUM AND A METHOD OF FABRICATING THE SAME

[75] Inventors: Kenichi Sato; Kazunobu Chiba; Yuichi Arisaka; Yukari Yamada, all of Miyagi, Japan

[73] Assignee: Sony Corporation, Tokyo, Japan

[21] Appl. No.: 902,869

[22] Filed: Jun. 23, 1992

[30] Foreign Application Priority Data

Jun. 28, 1991 [JP] Japan ..................... 3-159167
Dec. 28, 1991 [JP] Japan ..................... 3-359089

[51] Int. Cl.⁶ ........................................ G11B 5/66
[52] U.S. Cl. ................ 428/332; 428/336; 428/408; 428/694 T; 428/694 TP; 428/694 TC; 428/695; 428/698; 428/699; 428/704; 428/707; 428/900
[58] Field of Search ................... 428/694, 900, 428/695, 332, 336, 408, 694 T, 694 TP, 694 TC, 698, 699, 704, 707

[56] References Cited

U.S. PATENT DOCUMENTS 4,411,963 10/1983 Aine ............................. 428/622
4,889,767 12/1989 Yokoyama et al. ............. 428/336

OTHER PUBLICATIONS

Patent Abstracts of Japan vol. 7, No. 101 (P–194) 28 Apr. 1983 & JP–A–58 026 320 (Matsushita Denki Sangyo KK) 16 Feb. 1983.

*Primary Examiner*—Leszek Kiliman
*Attorney, Agent, or Firm*—William S. Frommer; Alvin Sinderbrand

[57] ABSTRACT

A magnetic recording medium comprised of a nonmagnetic support; a magnetic metal thin film formed on one major surface of the nonmagnetic support; and a protective film of a corrosion-resistant metal or a multilayer protective film structure consisting of a corrosion-resistant metal film and a durable protective film of a hard material. A multilayer protective film structure is formed by sputtering a corrosion-resistant protective film and a durable protective film over the magnetic metal thin film while the nonmagnetic support travels along the circumference of a cooling cylinder by using at least one target of a corrosion-resistant metal and at least one target of a hard material, or by using a composite target composed of at least one corrosion-resistant metal and one hard material. The protective film suppresses the corrosion of the magnetic metal thin film and improves the corrosion resistance and durability of the magnetic recording medium.

24 Claims, 10 Drawing Sheets

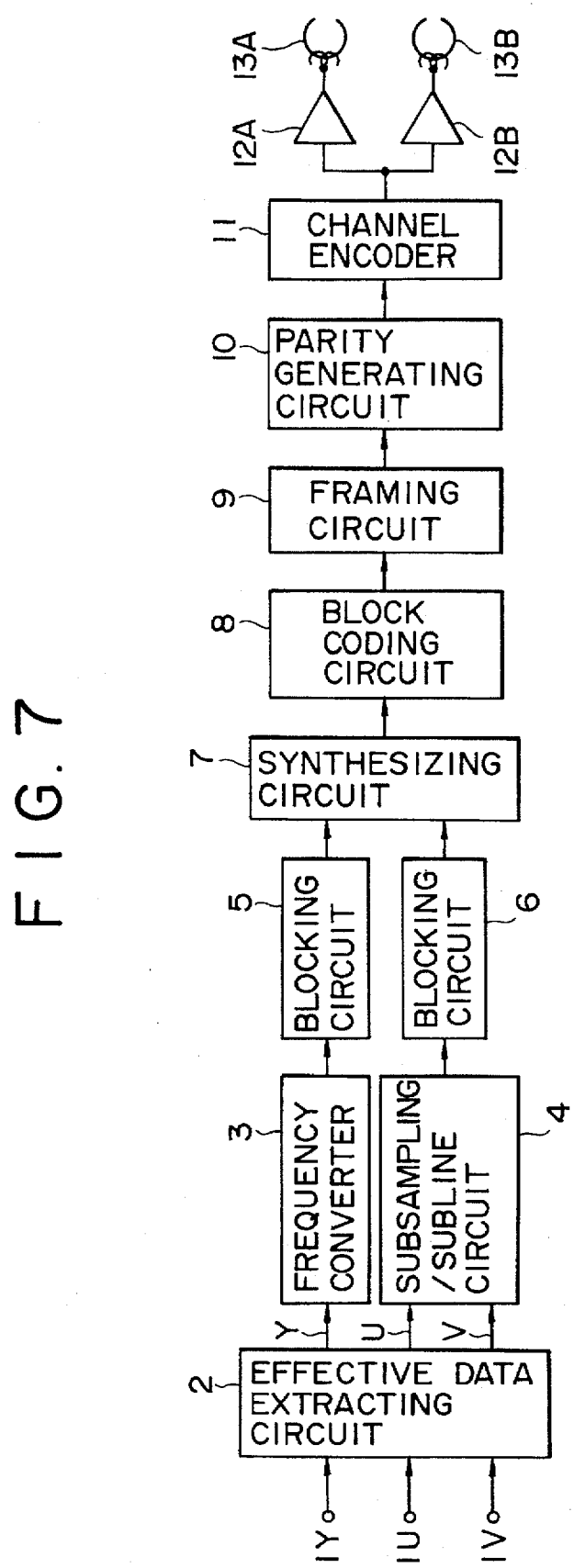
F I G. 7

5,672,425

MAGNETIC RECORDING MEDIUM AND A METHOD OF FABRICATING THE SAME

BACKGROUND OF THE INVENTION

1. Field of the Invention

The present invention relates to a magnetic recording medium having a magnetic layer consisting of magnetic metal thin films and a method of fabricating the same and, more particularly, to such a magnetic recording medium suitable for use on digital video tape recorders (VTRs).

2. Description of the Prior Art

High-density recording has been promoted for improving the quality of pictures recorded by a VTR and there have been proposed, to facilitate high-density recording, magnetic recording media employing magnetic metal thin films of magnetic metals, such as Co, a Co-Ni alloy, a Co-Cr alloy and Co-O, formed by a plating process or a vacuum thin film forming process, such as sputtering or vacuum evaporation, on a support, such as a polyester film, a polyamide film or a polyimide film.

For example, a magnetic tape produced by the evaporation process is provided with a magnetic layer formed by depositing the vapor of a magnetic metal obliquely on the surface of a support film. This oblique evaporation magnetic tape has excellent properties and the manner in which the magnetic layer is constructed facilitates recording by use of a ring head and demagnetization of recorded magnetic signals occurs slowly. This evaporation magnetic tape has been used as the magnetic recording medium for 8 mm VTRs.

However, the evaporation magnetic tape is not as durable or as corrosion resistive as may be desired because the magnetic layer is formed of a metal film and has a nearly specular surface. To provide sufficiently high durability, the area of contact between the magnetic tape and a magnetic head is reduced by providing the surface of a base film with minute projections that affect the surface irregularity of a magnetic metal thin film formed on that surface. The magnetic metal thin film of some evaporation magnetic tapes is coated with a lubricant and/or a rust preventive material to improve durability and reliability. These measures to enhance the durability and reliability of evaporation magnetic recording media, however, are not sufficiently effective for magnetic recording media for professional uses or for digital VTRs and there has been an investment in research and development to develop further advances.

For example, defects are present in a recording pattern and a degraded picture is displayed due to dropout in the digital signals if the magnetic layer is corroded. Accordingly, the magnetic layer must have sufficiently high corrosion resistance and the surface of the magnetic layer must be finished by effective surface treatment.

The speed of the magnetic tape relative to a magnetic head on a digital VTR is at least twice the speed of a magnetic tape relative to a magnetic head on an 8 mm VTR. Therefore, an improvement in the surface properties of a magnetic tape by minute irregularities and by adding a lubricant are not sufficiently effective to improve durability.

Attempts have been made to improve the corrosion resistance and durability of magnetic tapes by forming an oxide layer over the surface of the magnetic metal thin film by oxidation. However, the oxide layer is unsatisfactory in structural compactness and is somewhat permeable to moisture. Accordingly, it is essential to design a magnetic recording medium so that the corrosion resistance and durability of the magnetic recording medium are sufficiently high when the magnetic recording medium is used on professional VTRs and on digital VTRs, particularly, digital VTRs which compress digital video signals and record those compressed video signals without creating distortion in the video picture which eventually is reproduced.

OBJECTS AND SUMMARY OF THE INVENTION

Accordingly, it is an object of the present invention to provide a magnetic recording medium with a magnetic metal thin film having sufficiently high corrosion resistance and is durable to severe operating conditions.

Another object of the present invention is to provide a magnetic recording medium that can be used with a digital VTR of the type which compresses digital video signals and records those compressed digital video signals without introducing distortion into the reproduced video picture, and wherein the reproduced digital video signals include only a few errors.

A further object of the present invention is to provide a method of fabricating a magnetic recording medium which exhibits excellent corrosion resistance and durability, without requiring extensive modification of existing manufacturing equipment.

As one aspect of the present invention, a magnetic recording medium comprises a nonmagnetic support, a magnetic metal thin film formed as a magnetic layer on the nonmagnetic support, and a corrosion-resistant protective film of a corrosion-resistant metal or a laminate protective film consisting of a corrosion-resistant protective film and a durable protective film of a hard material formed on the magnetic metal thin film.

As another aspect of this invention, a method of fabricating a magnetic recording medium includes the steps of forming a protective layer by applying a magnetic metal thin film as a magnetic layer on one major surface of a nonmagnetic support, as by sputtering, and advancing the magnetic recording medium along the circumference of a cooling cylinder, wherein a target of a corrosion-resistant material and a target of a hard material are arranged around the cooling cylinder. Alternatively, a composite target of a corrosion-resistant material and a hard material is placed near the circumference of the cooling cylinder to form the protective layer in a laminate structure consisting of a corrosion-resistant film of the corrosion-resistant material and a durable protective film of the hard material.

As shown in FIG. 1, a magnetic recording medium in accordance with the present invention comprises a nonmagnetic support 101, a magnetic metal thin film 102 as a magnetic layer formed on the nonmagnetic support 101, and a corrosion-resistant protective film 103 of a corrosion-resistant metal formed over the magnetic metal thin film 102.

The magnetic metal thin film 102 may be formed of any magnetic material generally used for forming a magnetic metal thin film for an evaporation magnetic tape. For example, a metal, such as Fe, Co or Ni, a ferromagnetic alloy, such as a Fe-Cu alloy, a Co-Cu alloy, Co-Pt alloy, a Co-Cr alloy, a Co-Ni alloy, a Co-Ni-Cr alloy, a Co-Ta alloy, a Co-Cr-Ta alloy, a Co-Cr-V alloy or a Fe-Co alloy, or such metal containing additives or an alloy of such metal may be used as the magnetic metal thin film.

The magnetic metal thin film 102 of such a material may be a single film or a laminate film. A ground layer or an intermediate layer of a metal or a metal oxide may be formed between the nonmagnetic support 101 and the magnetic metal thin film 102 or, if the magnetic metal thin film 102 is a laminate film, between the component films of the magnetic metal thin film 102.

The magnetic metal thin film 102 may be formed by any suitable thin film forming process, such as vacuum evaporation, sputtering or ion plating.

The nonmagnetic support 101 may be of any material generally used for forming a nonmagnetic support in magnetic recording media of this kind.

The corrosion-resistant protective film 103 overlying the magnetic metal thin film 102 improves the corrosion resistance of the magnetic metal thin film by preventing the magnetic metal thin film from being permeated by moisture. The corrosion-resistant film is formed of a metal such as Cr, Cu, Ni, W, Ta, Mo, Zn, Pt, V, Au, In, Al, Sn or Pb, a Cr-Ti alloy, a Cr-Zr alloy, a Cr-Nb alloy, a Cr-Ta alloy, a Cr-Al alloy, a Cr-Zn alloy, a Cu-Ni alloy or a Ni-Mo-Cr-Fe alloy (Hastelloy).

The corrosion-resistant protective film 103 may be formed by any suitable process, such as sputtering, vacuum evaporation, ion plating or plasma CVD.

Preferably, the thickness of the corrosion-resistant protective film 103 is 30 Å (3 nm) or more. If the thickness of the corrosion-resistant protective film 103 is less than 30 Å, the corrosion-resistant performance thereof is unsatisfactory.

The corrosion-resistant film 103 may be coated with a durable protective film 104 of a hard material as shown in FIG. 2. The hard material is $SiO_2$, $Si_3N_4$, $SiN_x$, BN, $ZrO_2$, $Al_2O_3$, $MoS_2$, TiN, SiC, carbon, $TiO_2$, or TiC.

Like the corrosion-resistant film, the durable protective film 104 may be formed by any suitable process, such as sputtering, vacuum evaporation, ion plating or plasma CVD.

Preferably, the thickness of the durable protective film 104 is 20 Å (2 nm) or more. The durability of the durable protective film 104 is unsatisfactory if the thickness thereof is less than 20 Å.

If the protective layer consisting of the corrosion-resistant film 103 and the durable protective film 104 is excessively thick, the reproduced signal output decreases due to spacing and error rate increases. Hence, the preferable thickness of the protective layer is 500 Å (50 nm) or less. The optimum thickness of the corrosion-resistant protective film 103 is in the range of 30 Å (3 nm) to 480 Å (48 nm) and the optimum thickness of the durable protective film 104 is in the range of 20 Å (2 nm) to 470 Å (47 nm).

If the magnetic recording medium is provided with both the corrosion-resistant film 103 and the durable protective film 104 in a laminate structure, then the corrosion-resistant film and the durable protective film will exhibit their full performance if the durable protective film overlies the corrosion-resistant film. When the corrosion-resistant film 103 and the durable protective film 104 are so formed, the magnetic recording medium exhibits excellent corrosion resistance and durability.

A magnetic recording medium in another aspect of the present invention may comprise, as shown in FIG. 3, a nonmagnetic support 101, a magnetic metal thin film 102 as the magnetic layer formed on the nonmagnetic support 101, and a multilayer laminant structure protective layer 105 consisting of a plurality of laminate layers of corrosion-resistant protective films 103 formed of a corrosion-resistant metal and durable protective films 104 formed of a hard material, overlying the magnetic metal thin film 102. The multilayer laminate protective layer 105 may be either a discrete laminate construction in which the component films are separated by distinct interfaces, or a complex laminate construction of a composition that varies periodically in the direction of the thickness and in which the corrosion-resistant metal and the hard material mix at their interfaces.

The multilayer laminate protective layer 105 is formed by a sputtering process. In forming the multilayer laminate protective layer 105 by sputtering, the nonmagnetic support having the magnetic metal thin film on its surface is fed by a feed roller to travel along the circumference of a cooling cylinder in an evacuated chamber. Atoms of the material which comprises the multilayer laminate protective layer 105 are sputtered from target means of protective materials and are deposited on the magnetic metal thin film to form the protective layer, and the base film carrying both the magnetic metal thin film and the protective layer is taken up by a take-up roll. The target means may be a plurality of targets or a single composite target.

The atoms of the corrosion-resistant metal and those of the hard material are sputtered from their respective targets arranged alternately along the direction of travel of the nonmagnetic support for deposit on the magnetic metal thin film while the base film travels along the circumference of the cooling cylinder, to form the multilayer laminate protective film. The targets of the corrosion-resistant metal and those of the hard material may be arranged contiguously so that these targets act as a single composite target. A multilayer laminate protective film formed by using such a composite target has a complex laminate construction in which the corrosion-resistant metal and the hard material mix in the boundaries of the corrosion-resistant film and the durable protective film. The composite target may be formed by closely arranging the corrosion-resistant metal and the hard material or by putting a pellet of the corrosion-resistant metal on the hard material.

The thickness of the protective layer of a multilayer laminate structure is 500 Å or less and, preferably, the uppermost film of the protective layer is a durable protective film.

The corrosion-resistant protective film coating the magnetic metal thin film on the nonmagnetic support prevents the penetration of moisture and thus suppresses the corrosion of the magnetic metal thin film. The durable protective film having high durability and a lubricating characteristic greatly enhances the durability of the magnetic recording medium.

The magnetic recording medium of the present invention is sufficiently durable and corrosion-resistant under severe operating conditions and supports the operation of a digital VTR to record compressed digital video signals and to reproduce those digital video signals with few errors.

The protective layer of a multilayer laminate construction can be formed without requiring any particular modification in the existing process and the existing fabricating equipment simply by arranging the targets of a corrosion-resistant metal and the targets of a hard material around the cooling roll so as to form by sputtering the protective layer on the nonmagnetic support as that support travels along the circumference of the cooling cylinder.

BRIEF DESCRIPTION OF THE DRAWINGS

The above and other objects, features and advantages of the present invention will become more apparent from the following description taken in connection with the accompanying drawings, in which:

FIG. 7 is a block diagram of the recording system included in a digital VTR for recording compressed digital video signals on the magnetic recording medium of the present invention;

DETAILED DESCRIPTION OF THE PREFERRED EMBODIMENTS

The present invention will be described hereinafter in connection with the accompanying drawings and tables showing experimental results.

In a first embodiment of the present invention, a magnetic recording medium suitable for use on a digital VTR is comprised of a nonmagnetic support, a magnetic metal thin film, and a protective film formed of a corrosion-resistant metal.

A sample magnetic recording medium was fabricated by vacuum evaporation. A major surface of a polyethylene terephthalate (PET) film, i.e., a base film, 10 µm in thickness was coated with an emulsion containing an acrylic ester latex as a principal constituent to form minute projections of acrylic ester latex particles on the major surface of the film. The center line average height Ra of the major surface of the base film was 0.0015 µm and the density of the minute projections was $5 \times 10^6/mm^2$.

Figure 1:
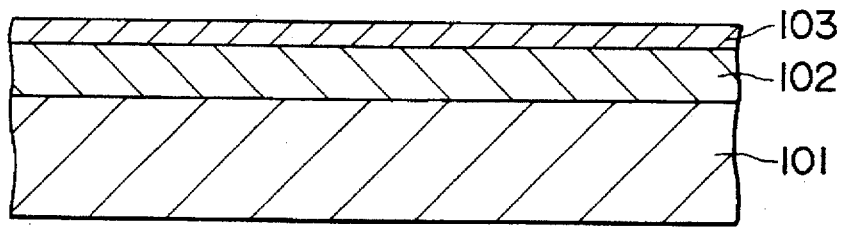
FIG. 1 is a schematic sectional view of a magnetic recording medium in accordance with a first embodiment of the present invention.
Figure 2:
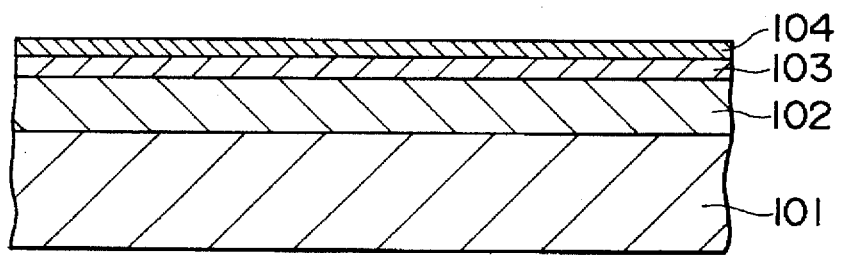
FIG. 2 is a schematic sectional view of a modification of the magnetic recording medium of FIG. 1.
Figure 3:
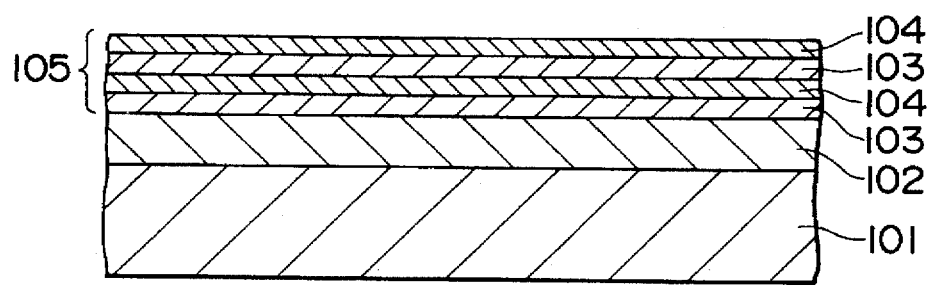
FIG. 3 is a schematic sectional view of a magnetic recording medium in accordance with a second embodiment of the present invention.
Figure 4:
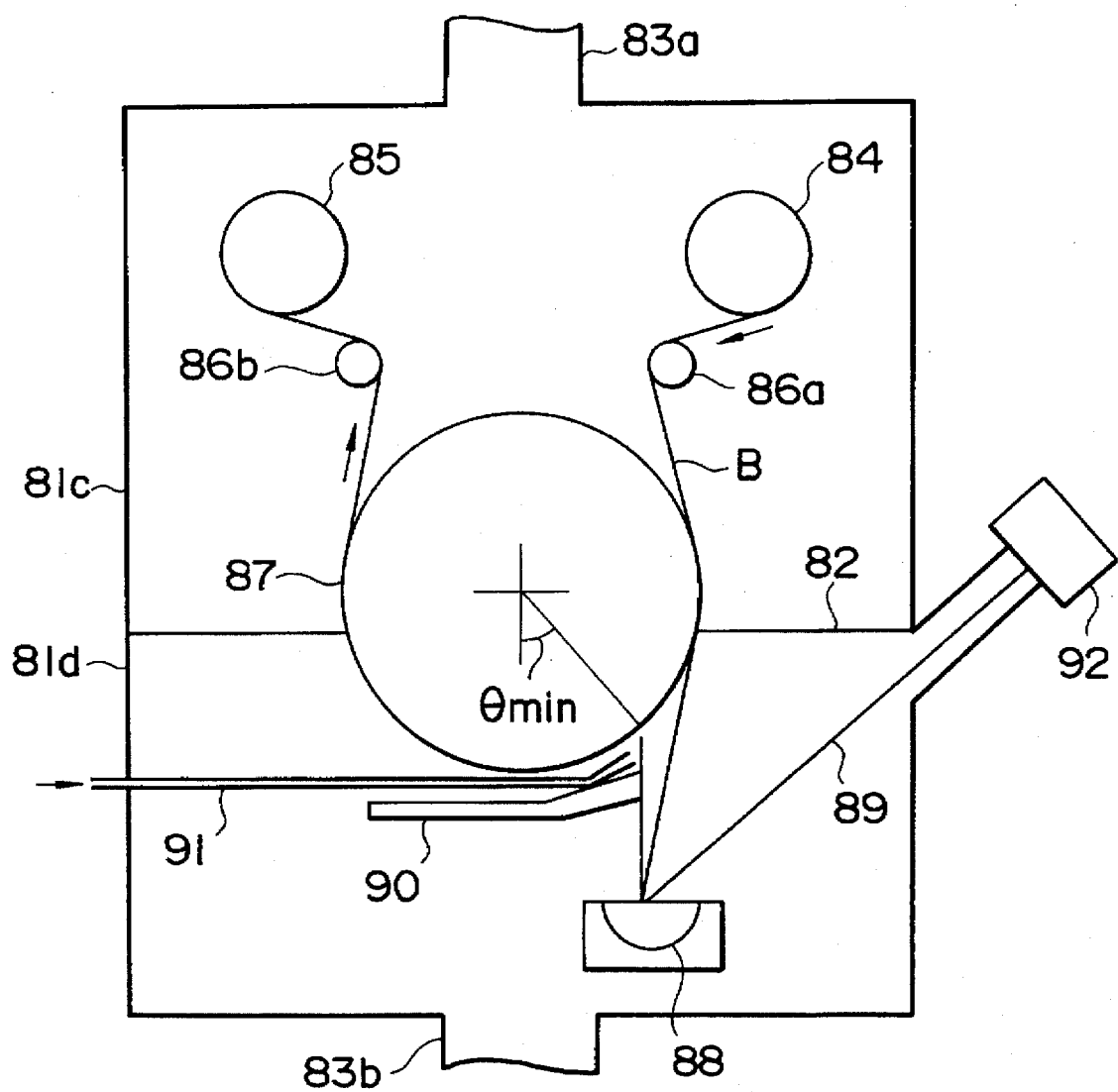
FIG. 4 is a schematic representation of typical vacuum evaporation apparatus that can be used with the present invention.

A magnetic metal thin film was formed on the base film by oblique evaporation in an oxygen atmosphere by the vacuum evaporation apparatus shown in FIG. 4. The vacuum evaporation apparatus includes vacuum vessels 81c and 81d, a partition plate 82 separating the vacuum vessels 81c and 81d, a cooling cylinder 87 disposed between the vacuum vessels 81c and 81d, and evacuating systems 83a and 83b connected respectively to the vacuum vessels 81c and 81d.

A feed roller 84 for feeding the base film B and a take-up roller 85 for taking up the base film B are disposed in the vacuum vessel 81c. The base film B is guided by guide rollers 86a and 86b so as to travel along the circumference of the cooling cylinder 87. An evaporation source 88 is disposed opposite the cooling cylinder 87 in the vacuum vessel 81d. A screening plate 90 for determining the angle of incidence of the evaporated metal on the surface of the base film B, and an oxygen supply pipe 91 are arranged near the cooling cylinder 87. The evaporation source may be any suitable material, for example, an elementary metal, such as Fe, Co or Ni, a CoNi alloy or a mixture of elements.

The evaporation source 88 is heated and evaporated by electron beams 89 projected by an electron gun 92 while the base film B runs along the circumference of the cooling cylinder 87 to form a magnetic metal thin film on the surface of the base film B by oblique evaporation. In this embodiment, the evaporation source 88 was Co, the vacuum vessels 81c and 81d were evacuated to a vacuum of $1 \times 10^{-4}$ torr, oxygen gas was supplied at 250 cm$^3$/min and the screening plate 90 was adjusted so that the evaporated metal falls on the base film B at an angle of incidence in the range of 45° to 90°.

The magnetic metal thin films of magnetic recording media thus formed were coated respectively with protective metal films of different metals having a thickness of 150 Å by an RF sputtering process and the corrosion resistance of the resultant magnetic recording media was examined. The process conditions of the RF sputtering process were 300 W in supply power and $3 \times 10^{-3}$ torr in Ar gas pressure. The corrosion resistance was evaluated by the saturation magnetization change ratio $\Delta Ms_1$ measured after storing the magnetic recording media for twenty days in an atmosphere of 50° C. and RH 90%, and the saturation magnetization change ratio $\Delta Ms_2$ measured after storing the magnetic recording media for twelve hours in an atmosphere of 5 ppm $SO_2$ gas, 35° C. and RH 80%. The measured results are summarized in Table 1 below.

As is obvious from Table 1, protective metal films of Ni and Cr are highly effective to improve the corrosion resistance of the magnetic recording media.

The effect of the thickness of the Ni film on the improvement of corrosion resistance was examined by measuring the saturation magnetization change ratio $\Delta Ms_2$ after storing the magnetic recording media for twelve hours in a 0.5 ppm $SO_2$ gas atmosphere of 35° C and RH 80%, and measuring the relative reproduced signal output (reproduced output relative to that of a magnetic recording medium not provided with any protective Ni film) with a signal wavelength of 0.5 µm and measuring the error rate. Measured results are set out in Table 2 below.

It is seen from Table 2 that a thicker protective Ni film has a more favorable effect on improving corrosion resistance. However, the reproduced signal output decreases and the error rate increases as the thickness of the protective film increases. Accordingly, the thickness of the protective Ni film must be selectively determined taking into consideration both the advantageous effect on the improvement in corrosion resistance and the disadvantageous effect on the performance of the magnetic recording medium in recording and reproducing signals.

Magnetic recording media provided with a two-layer protective film consisting of a lower layer formed of a 150

Å thick metal film and an upper layer formed of a 150 Å thick abrasion-resistant protective film were fabricated. The upper and lower layers of the respective two-layer protective films of the different magnetic recording media were fabricated from different materials. The durability, corrosion resistance and error rate of the magnetic recording media were examined; and the measured results are set out in Table 3 below. The durability, i.e., the still mode endurance, was evaluated on the basis of time in which the output decreased 3 dB in a still playback mode. Corrosion resistance was tested by a gas tester and evaluated on the basis of the observed condition of the surface and on the saturation magnetization change ratio $\Delta MS_2$ measured after storing the magnetic recording media for twelve hours in a $SO_2$ gas atmosphere of 35° C. and RH 80%.

As is obvious from Table 3, although a metal film improves the corrosion resistance of the magnetic recording medium, the durability of a magnetic recording medium provided with only a metal film as the protective layer is insufficient and its error rate is high. The magnetic recording medium provided with a two-layer protective film, consisting of a metal film and an abrasion-resistant protective film, is satisfactory in both durability and corrosion resistance and has a low error rate. The error rate must not be greater than $1 \times 10^{-4}$ if errors are to be corrected by the use of an error correction code having a redundancy on the order of 20%. It is seen from Table 3 that use of the metal film reduces the error rate below this limit. It is also seen that a two-layer protective film consisting of a metal film of Ni and an abrasion-resistant protective film of carbon is most effective, and a magnetic recording medium provided with this two-layer protective film meets the requirements that still mode endurance is five hours or longer and that the saturation magnetization change ratio $\Delta MS_2$ is -5% or below.

Table 4 summarizes the performance of two-layer protective films formed of different combinations of metal films and abrasion-resistant protective films. The magnetic metal thin films of the examples are $Co_{80}Ni_{20}$ (subscript numbers of Co and Ni are values of Co content and Ni content in percent by weight) films of 0.2 µm in thickness formed by an oblique evaporation process, in which oxygen was supplied at $3.3 \times 10^{-8}$ m³/sec. The back surfaces of the base films were coated with a 0.6 µm thick back coating film of a mixture of carbon and an urethane binder. The protective films were formed by a dc magnetron sputtering process, in which Ar gas pressure was 0.7 Pa, the distance between the base plates was 80 mm, and the thickness of the protective films was determined by regulating the input power. Still mode endurance and saturation magnetization change ratio $\Delta Ms_2$ were measured after storing the magnetic recording media in a $SO_2$ gas atmosphere of 35° C. and RH 80% for twenty-four hours. Measured results are shown in Table 4.

As is obvious from Table 4, the two-layer protective film of the corrosion-resistant protective film and the durable protective film improves both the corrosion resistance and the durability of the magnetic recording medium greatly. Since the thickness of the protective film was fixed, there was little change in the reproduced output level and error rate. The reproduced output level was -3.7 dB relative to the reproduced output 0 dB for a magnetic recording medium not provided with any protective film when the wavelength of the signal was 0.54 µm; and the error rate was $9 \times 10^{-6}$.

Table 5 summarizes the effect of the thickness of the protective film on the still mode durability and corrosion resistance of magnetic recording media provided with a two-layer protective film consisting of a metal film of Ni and an abrasion-resistant protective film of carbon. The thickness of the metal film and the abrasion-resistant protective film of the different media differ from each other; and the magnetic recording media were stored in a $SO_2$ gas atmosphere of 35° C. and RH 80% for twelve hours.

It is seen from Table 5 that the magnetic recording medium having a thicker abrasion-resistant protect film has a higher still mode endurance, and the thicker the metal film, the smaller is the reduction of saturation magnetization. However, as mentioned above, if the protective film is excessively thick, the reproduced output is reduced due to spacing loss and, thus, the error rate increases. Therefore, the thickness of the two-layer protective film must be selectively determined taking into consideration the effect thereof on the reproduced output and the error rate.

Table 6 summarizes the performance of magnetic recording media provided with two-layer protective films consisting of an upper layer of carbon and a lower layer of Cu. Reproduced output level was measured by reproducing signals of 0.54 µm in wavelength by a magnetic head having a gap length of 0.2 µm. The speed of the magnetic head relative to the magnetic recording medium was 3.8 m/min.

It is seen from Table 6 that the reproduced output level is reduced due to spacing loss if the two-layer protective film is excessively thick. Preferably, the thickness of the two-layer protective film is 50 nm or less. The magnetic recording medium provided with a durable protective layer of a thickness in the range of 2 nm to 47 nm as the upper layer of the two-layer protective film has a still mode endurance of five hours or longer. A corrosion-resistant layer of a thickness in the range of 3 nm to 48 nm as the lower layer of the two-layer protective film improves the corrosion resistance greatly.

A magnetic recording medium in accordance with a second embodiment of the present invention is provided with a multilayer protective film consisting of layers of a corrosion-resistant metal and a hard material fabricated by sputtering.

Figure 5:
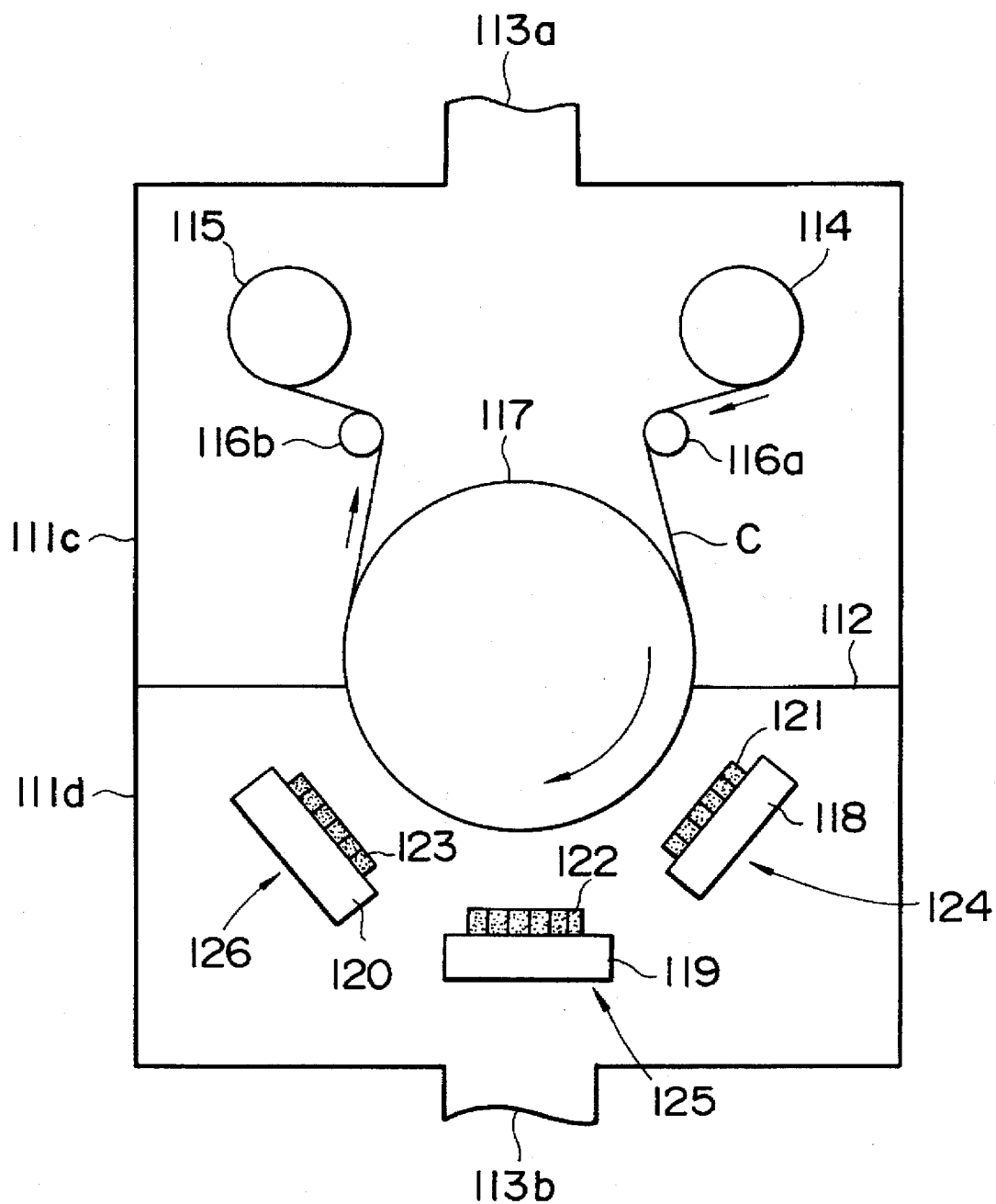
FIG. 5 is a schematic representation of typical sputtering apparatus that can be used with this invention.

FIG. 5 illustrates a sputtering apparatus employed in fabricating the magnetic recording medium in the second embodiment and has vacuum vessels 111c and 111d, a partition plate 112 separating the vacuum vessels 111c and 111d, a cooling cylinder 117 disposed between the vacuum vessels 111c and 111d, and evacuating systems 113a and 113b connected respectively to the vacuum vessels 111c and 111d.

A feed roller 114 for feeding a base film C consisting of a nonmagnetic support and a magnetic metal thin film formed on one major surface of the nonmagnetic support, and a take-up roller 115 are disposed in the vacuum vessel 11c. The base film C is guided by guide rollers 116a and 116b so as to travel along the circumference of the cooling cylinder 117. The base film C travels downward toward the cooling cylinder 117, along the circumference of the cooling cylinder 117 and upward toward the take-up roller 115. The diameter of the cooling cylinder 117 is greater than the diameter of the feed roller 114 and the take-up roller 115. The effective axial length of the feed roller 114, the take-up roller 115 and the cooling cylinder 117 is substantially equal to the width of the base film C.

Targets 121, 122 and 123 are placed respectively on three backing plates 118, 119 and 120 of a conductive metal disposed under the cooling cylinder 117 in the vacuum vessel 111d. A negative voltage is applied to the backing plates 118, 119 and 120 to make the targets 121, 122 and 123 function as cathodes. The targets 121, 122 and 123 are formed of corrosion-resistant metals, hard materials or composite material composed of a corrosion-resistant metal and a hard material. When the targets 121, 122 and 123 are corrosion-resistant metals and hard materials, respectively, a particular number of the corrosion-resistant metals and a particular number of the hard materials are arranged so that a desired number of films of desired compositions are formed in layers to construct a desired multilayer laminate protective film. When the targets 121, 122 and 123 are composite targets, each of the targets 121, 122 and 123 may be formed as a composite target 128 of the type shown in FIG. 6, which consists of three film forming materials 128a, 128b and 128c, i.e., corrosion-resistant metals and hard materials, arranged along the direction of travel of the base film C. The component materials of the composite target 128 are arranged so that a desired number of films of desired compositions are formed in layers.

Corrosion-resistant metals that may be used, are Cr, W, Ta, Mo, Zn, Pt, V, Au and In, and hard materials that may be used are $SiO_2$, $Si_3N_4$, $SiN_x$, BN, $ZnO_2$, $Al_2O_3$, $MoS_2$, SiC and carbon.

The base film C fed out by the feed roller 114 travels along the circumference of the cooling cylinder 117 in the direction of the arrow X and is taken up by the take-up roller 115. A multilayer laminate protective film is formed on the base film C by sputtering while the base film C travels along the circumference of the cooling cylinder 117.

Atoms sputtered from the cathodes 124, 125 and 126, i.e., the targets 121, 122 and 123 disposed under the cooling cylinder 117, deposit successive layers on the base film to form a multilayer laminate protective film while the base film C travels at a constant speed along the circumference of the cooling cylinder 117. Since the required number of targets of the corrosion-resistant metal and the required number of targets of the hard material are arranged in a predetermined order, the multilayer laminate protective film consists of corrosion-resistant protective films of the corrosion-resistant metal and durable protective films of the hard material. When composite targets are used, the multilayer laminate protective film consists of a plurality of layers of protective films of the corrosion-resistant metal and protective films of the hard material and has complex interfaces between the adjacent protective films consisting of a mixture of the corrosion-resistant metal and the hard material.

To form a magnetic recording medium using the foregoing sputtering apparatus, a base film C was fabricated by coating a 10 μm thick PET film with a suspension consisting of a binder containing acrylic ester as a principal constituent, $SiO_2$ particles of an average particle size of 18 nm and isopropyl alcohol so that the $SiO_2$ particle density is $10^7$ particles/$mm^2$. magnetic metal thin film of $Co_{80}Ni_{20}$ (subscript numerals indicate content in percent by weight) having a thickness of 200 nm was formed on the PET film in an oxygen atmosphere by oblique evaporation, in which oxygen gas was supplied at a flow rate of 300 $cm^3$/min and the angle of incidence of metal particles on the surface of the PET film was controlled to be in the range of 40° to 90°. Then, the backside of the PET film was coated with a back coat of carbon and urethane.

Figure 6:
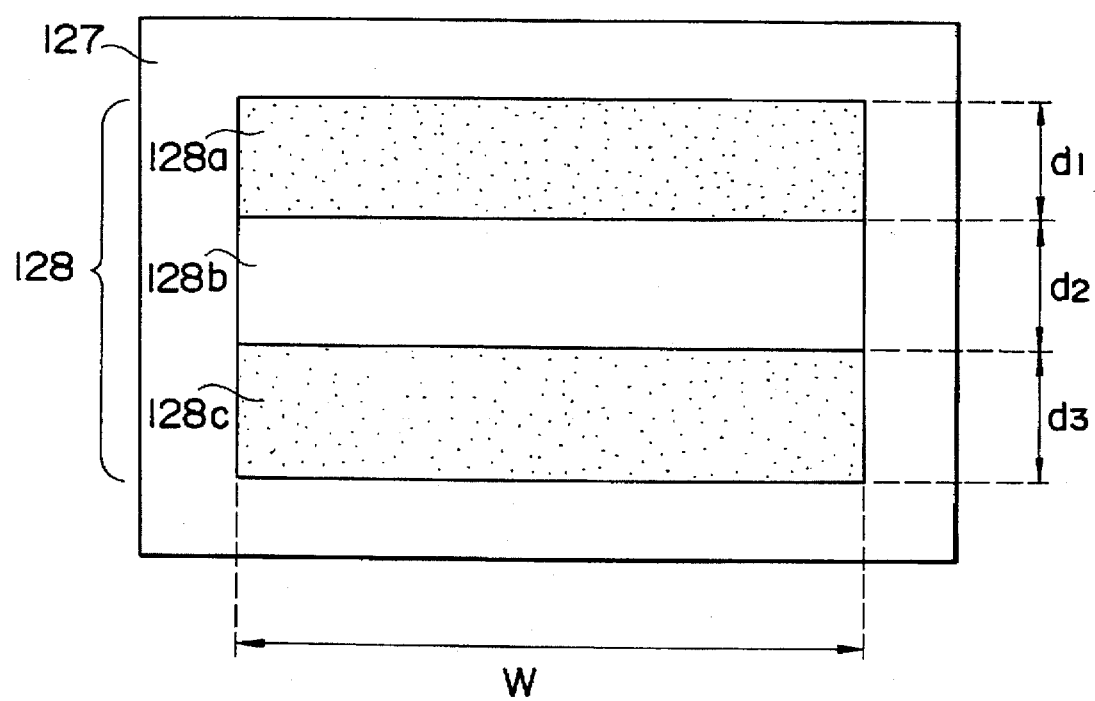
FIG. 6 is a schematic representation of a composite target that can be used in FIG. 5.

A protective film of 200 Å in thickness was formed by a sputtering process over the magnetic metal thin film on the base film C. In the sputtering process, the targets 121, 122 and 123 were disposed at a distance of 50 mm from the cooling cylinder 117, Ar gas was used as the discharge gas, and the vacuum vessels 111c and 111d were evacuated to a vacuum of 2 Pa. The materials of the targets 121, 122 and 123 were changed to fabricate the magnetic recording media of comparative example 1 and of examples 1 and 2 described below. The targets 121, 122 and 123 were 200 mm in width and 150 mm in length. A composite target as shown in FIG. 6 was used, with a target 128 placed on a backing plate 127. The target 128 consists of a carbon block 128a, a chromium block 128b and a carbon block 128c closely arranged in that order along the direction of travel of the base film C. The width W of the composite target was 200 mm, the length $d_1$ of the carbon block 128a was 50 mm, the length $d_2$ of the chromium block 128b was 50 mm and the length $d_3$ of the carbon block 128c was 50 mm. Electric power of 4 kW was supplied to each target. In fabricating the recording medium of example 1, electric power of 1.5 kW was supplied to the target 122. The protective films on the base film C in comparative example 1 and in examples 1 and 2 were coated with perfluoropolyether, and then the base film C was cut into 8 mm wide magnetic tape samples.

The still mode endurance time and remanent magnetic flux density change ΔBr of the magnetic tape samples were measured to evaluate the durability and corrosion resistance, respectively, thereof; and the magnetic tape samples were subjected to shuttle tests to evaluate their sliding property. Still mode endurance time was measured by a VTR EV-S1 modified (SONY) and the output signal of the VTR was recorded by a pen recorder. The magnetic tape samples were kept for twenty-four hours in an atmosphere of 0.3 ppm $SO_2$ concentration, 30° C. and RH 90% before measuring the remanent magnetic flux density change ΔBr.

In the shuttle tests, each magnetic tape sample of a length corresponding to a recording time of thirty minutes was driven 100 times on the VTR EV-S1 modified (SONY) and the difference between the initial output level and the final output level was measured.

The measured results are summarized in Table 7. As seen from Table 7, the comparative example 1 is provided with a hard, multilayer laminate protective film consisting of only carbon films and has satisfactory durability, whereas the corrosion resistance and the sliding property of this sample are not satisfactory. Example 1 is provided with a multilayer laminate protective film consisting of alternate carbon and chromium films and exhibits satisfactory durability, corrosion resistance and sliding property. Example 2 is provided with a multilayer laminate protective film of a complex laminate construction consisting of alternate carbon and chromium films and having complex interfaces between the component films. The corrosion resistance and sliding property of example 2 are better than those of example 1. Thus, it is seen from Table 7 that a multilayer laminate protective film consisting of protective films of a hard material, formed over a magnetic metal thin film on one major surface of a nonmagnetic support greatly improves the corrosion resistance and durability of the magnetic recording medium. Thus, the magnetic recording medium of the present invention is particularly suitable for use on a digital VTR. A preferred type of digital VTR that may be used with this invention now will be described.

Practical digital VTRs which convert color video signals into digital signals and record the digital signals on a recording medium, such as magnetic tape, are classified into component type digital VTRs which exhibit the D1 format and composite type digital VTRs which exhibit the D2 format. D1 and D2 type VTRs are intended for use by broadcasting stations.

The digital VTR of the D1 format converts analog luminance signals and first and second analog color difference signals into digital signals at sampling frequencies of 13.5 MHz and 6.75 MHz, respectively. The digital signals are processed and recorded on a magnetic tape. Since the ratio of the sampling frequencies used for sampling the components of the signals is 4:2:2, the digital VTR of the D1 format also is known as a 4:2:2 digital VTR.

The digital VTR of the D2 format digitizes composite color video signals by sampling them at a sampling frequency four times the frequency of a color subcarrier signal. The digital signals are processed and recorded on a magnetic tape.

Since both the digital VTR of the D1 format and the digital VTR of the D2 format are intended to be used by broadcasting stations, priority is given to picture quality in the design of these digital VTRs. Consequently, these digital VTRs record 8-bit samples of the digital color video signals substantially without compression. Therefore, the playback time or capacity of the digital VTR of, for example, the D1 format, is only on the order of one and one-half hours at the most, even if a tape cassette of large capacity is used. Hence, a digital VTR of the D1 format is unsuitable for consumer use.

The digital VTR described hereinafter records signals whose shortest wavelength is 0.5 µm on tracks that are 5 µm in width with a recording density of $8 \times 10^5$ bits/mm$^2$ and employs a method of compressing the information to be recorded without producing significant reproducing distortion so as to achieve long-time recording and reproducing capacity even if the magnetic tape is narrow, with a width of 8 mm or less.

FIG. 7 illustrates the general construction of a recording system in which digital luminance signals Y and digital color difference signals U and V that are extracted from color signals R, G and B produced by, for example, a color video camera, are received at input terminals 1Y, 1U and 1V, respectively. The clock rates of the digital signals Y, U and V are equal to the sampling frequencies of the component signals in the D1 format, namely sampling frequencies of 13.5 MHz and 6.75 MHz, and each sample is represented by eight bits. Therefore the bit rate of the signals applied to the input terminals 1Y, 1U and 1V is about 216 Mbps. This data bit rate is compressed to about 167 Mbps by not digitizing the video blanking intervals and by extracting data only in the effective viewing region by an effective data extracting unit 2.

The luminance signals Y in the output signals of the effective data extracting circuit 2 are coupled to a frequency converter 3 which converts the sampling frequency of 13.5 MHz into a frequency equal to ¾ of 13.5 MHz. The frequency converter 3 employs, for example, a thinning filter to prevent convolutional distortion. The output signal of the frequency converter 3 is supplied to a blocking circuit 5 which converts the usual raster scan sequence of luminance data into a sequence of blocks of picture data. A block coding circuit 8 is connected to the blocking circuit 5 by way of a synthesizing circuit 7.

Figure 9:
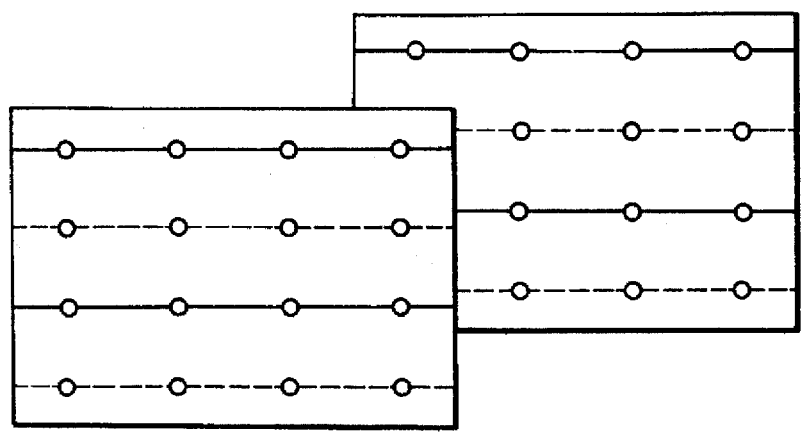
FIG. 9 is a diagrammatic view of blocks of video data suitable for block coding by the recording system of FIG. 7.

FIG. 9 illustrates the structure of a three-dimensional block to be coded as comprising a 4-line×4-picture-element×2-frame block, formed by dividing a screen or image spread over for example, two frames. In FIG. 9, lines of the odd fields are represented by continuous lines, and lines of the even fields are represented by broken lines. A video picture then is encoded into several 4 lines×4 picture sample×2 frame blocks.

Figure 10:
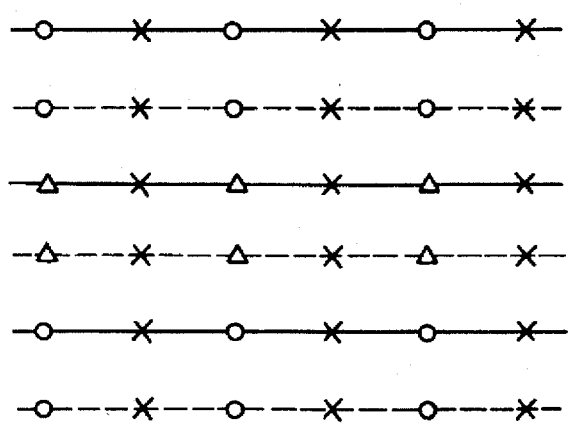
FIG. 10 is a diagrammatic view that is useful in explaining subsampling/subline processing in the recording system.

The two color difference signals U and V in the output signals produced by the effective data extracting circuit 2 are coupled to a subsampling/subline circuit 4. The subsampling/subline circuit 4 changes the 6.75 MHz sampling frequency of the color difference signals into a sampling frequency of ½ of 6.75 and combines alternate line intervals of the two digital color difference signals into one channel of color difference data. Hence, the subsampling/subline circuit 4 provides line sequential color difference digital signals. FIG. 10 represents the raster construction of the signals produced by the subsampling/subline circuit 4, in which blank circles represent subsampled pictured data of the first color difference signal U that is retained, blank triangles represent subsampled picture data of the second color difference signal V that is retained, and crosses represent subsampled picture data that is removed by subsampling.

The line sequential color difference output signals of the subsampling/subline circuit 4 are supplied to a blocking circuit 6 which is similar to the blocking circuit 5 and converts the color difference data in the usual raster scanning sequence of television signals into a sequence of blocks of picture data. The blocking circuit 6 converts the color difference data into 4-line×4 picture samples×2-frame blocks. The block-encoded output signals of the blocking circuits 5 and 6 are supplied to synthesizing circuit 7.

The synthesizing circuit 7 combines the block-encoded luminance signals and the block-encoded color difference signals into one channel and supplies the same to block coding circuit 8. The block coding circuit 8 is adapted to compress the data in a block and may be an adaptive dynamic range coding circuit (hereinafter referred to as "ADRC") or a discrete cosine transform circuit (hereinafter referred to as "DCT circuit"). The output signal of the block coding circuit 8 is coupled to a framing circuit 9 which arranges the ADRC or DCT encoded signals into a frame structure. The framing circuit 9 also converts the clock frequency of the ADRC or DCT encoded signals to that of the recording system.

The output signal of the framing circuit 9 is supplied to a parity generating circuit 10 for generating parity data for use as an error correction code. The output signal of the parity generating circuit 10 is applied to a channel encoder 11 for encoding in a recording code to decrease the low frequency components of the recording data. The encoded signal from the channel encoder 11 is coupled through recording amplifiers 12A and 12B and a rotary transformer, not shown, to a pair of magnetic heads 13A and 13B for recording on a magnetic tape. Video signals and audio signals are compressed and coded separately before being applied to the channel encoder 11.

The foregoing signal processing extracts only the data in the effective scanning period to reduce input data from 216 Mbps to about 167 Mbps. This data is further reduced to 84 Mbps by frequency conversion, subsampling and subline processing. Then, the reduced data is compressed and coded by the block coding circuit 8 to about 25 Mbps and additional data, such as parities and audio signals, are added to provide recording data of 31.56 Mbps.

Figure 8:
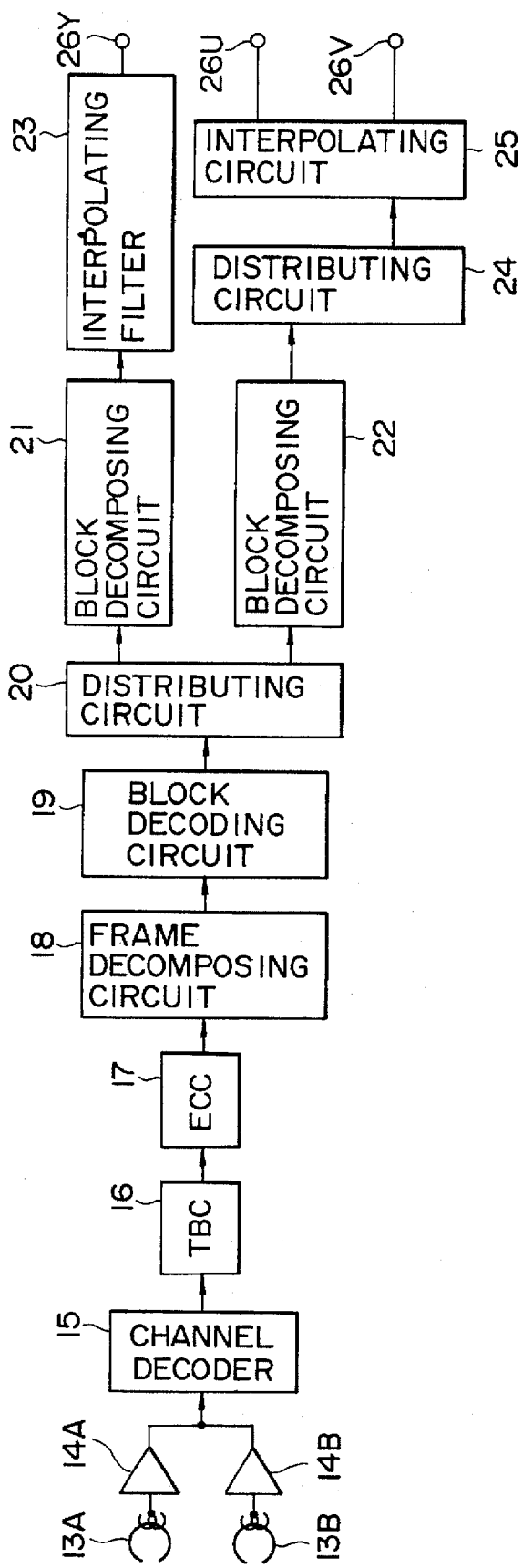
FIG. 8 is a block diagram of the reproducing system for recovering the digital video signals recording by the system of FIG. 7.

Referring to FIG. 8, there is illustrated the reproducing circuit that is compatible with the recording system of FIG. 7, wherein reproduced data read by the magnetic heads 13A and 13B are transmitted through a rotary transformer and reproducing amplifiers 14A and 14B to a channel decoder 15. The channel decoder 15 is complementary to channel encoder 11 and decodes the reproduced data which then is supplied to a TBC (time base corrector) 16. The TBC 16 removes time base errors from the reproduced data, and couples the time base corrected data to an ECC 17 for error correction and error modification using error correction code. The output signal of the ECC 17 is applied to a frame decomposing circuit 18.

The frame decomposing circuit 18 reduces the frame structure of the error-corrected data and separates the components of the block-coded data (i.e. the ADRC or DCT encoded signals) and also changes the clock frequency thereof from that of the recording system to the clock frequency of the original ADRC or DCT encoded signals. The data recovered by the frame decomposing circuit 18 is supplied to a block-decoding circuit 19 which decodes the ADRC or DCT signals originally produced by block coding circuit 8 of FIG. 7, and couples the recovered block-encoded data to a distributing circuit 20. The distributing circuit 20 separates the block-encoded data into block-encoded luminance signals and block-encoded color difference signals, and supplies the luminance signals and the color difference signals to block decomposing circuits 21 and 22, respectively. The block decomposing circuits 21 and 22 are complementary to blocking circuits 5 and 6 (FIG. 7) and convert the block-encoded data from block format into the format of a raster scanning sequence.

A decoded luminance signal produced by the block decomposing circuit 21 is coupled to an interpolating filter 23 which changes the sampling rate of the luminance signal from 3 fs to 4 fs (=13.5 MHz), and supplies a digital luminance signal Y to an output terminal 26Y.

The block decomposing circuit 22 produces the digital color difference signals which are supplied to a distributing circuit 24 that separates the line sequence digital color difference signals U and V into respective digital color difference signal U and V, and couples the same to an interpolating circuit 25 for interpolation. The interpolating circuit 25 interpolates the data derived from the extracted lines and picture elements to supply digital color difference signals U and V having a sampling rate of 2 fs to output terminals 26U and 26V.

The block-coding circuit 8 shown in FIG. 7 is an ADRC encoder (adaptive dynamic range coding encoder) which detects the maximum MAX and the minimum MIN of the plurality of picture element data included in each block, determines the dynamic range DR of the block, and carries out a coding operation in accordance with this dynamic range DR for requantization using a number of bits to represent a picture element that is smaller than the number of bits of the original picture element data. Alternatively, the block coding circuit 8 may be of the type that converts the picture element data of each block by DCT (discrete cosine transform) into coefficient data, quantizes the coefficient data obtained by DCT, and subjects the quantized data to Huffman run length coding for compression-coding.

An ADRC circuit which does not deteriorate picture quality even when signals are recorded in a multidubbing mode will be described with reference to FIG. 11.

Figure 11:
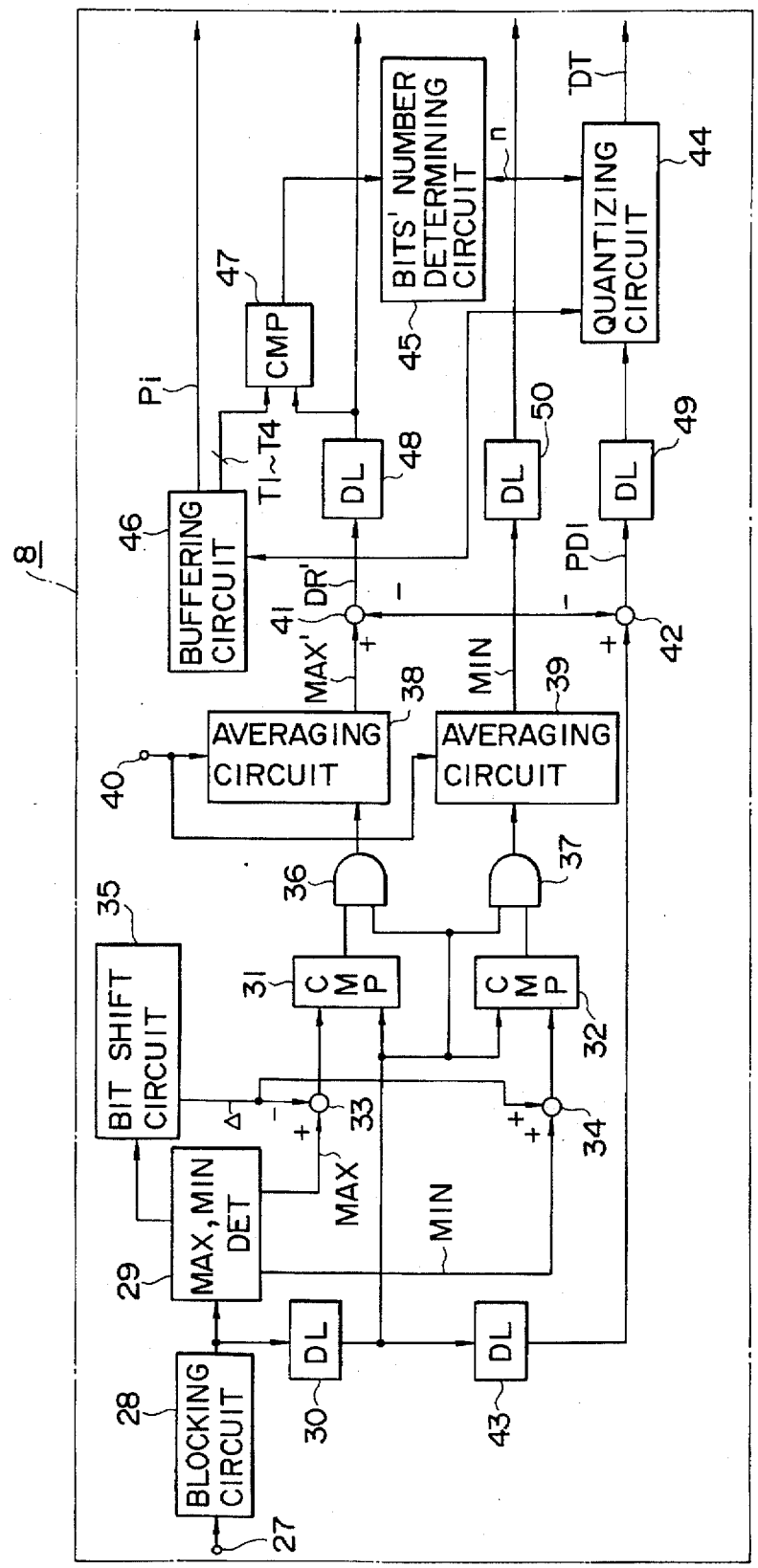
FIG. 11 is a block diagram of a block coding circuit that may be used in FIG. 7.

Referring to FIG. 11, the synthesizing circuit 7 (FIG. 7) applies a digital video signal (or digital color difference signal), such as a block-encoded luminance signal or block-encoded color difference signals, quantized by eight bits for each sample through an input terminal 27 and a blocking circuit 28 to a maximum/minimum detecting circuit 29 and to a delay circuit 30. The maximum/minimum detecting circuit 29 detects the maximum MAX and the minimum MIN in each block. The delay circuit 30 delays the block-encoded data for a time equal to the inherent delay in detecting the maximum MAX and the minimum MIN and supplies picture element data to comparators 31 and 32.

The maximum MAX and the minimum MIN detected by the maximum/minimum detecting circuit 29 are coupled to a subtracter 33 and an adder 34, respectively. A bit shift circuit 35 applies a quantizing step width $\Delta$ of $1/16$ DR for nonedge-matching quantization of a fixed length of 4 bits to the subtracter 33 and the adder 34. The bit shift circuit 35 achieves this by shifting the determined dynamic range DR by four bits for a division of $1/16$. The subtracter 33 provides a threshold of (MAX–$\Delta$) and the adder provides a threshold of (MIN+$\Delta$). These thresholds are applied to the comparators 31 and 32, respectively. The quantizing step width $\Delta$ may be replaced, if desired, by a fixed value corresponding to a noise level.

The output signal of the comparator 31 is applied to an AND gate 36 and the output signal of the comparator 32 is applied to an AND gate 37. The delay circuit 30 applies the delayed input data to the AND gates 36 and 37 as well. The output signal of the comparator 31 is HIGH when the input data is greater than the threshold. Accordingly, input picture element data within a maximum level range of MAX to (MAX–$\Delta$) appears at the output terminal of the AND gate 36. The output signal of the comparator 32 is LOW when the input data is smaller than the threshold. Accordingly, the input picture element data in a minimum level range of MIN to (MIN+$\Delta$) appears at the output terminal of the AND gate 37.

The output signal of the AND gate 36 is coupled to an averaging circuit 38 and the output signal of the AND gate 37 is coupled to an averaging circuit 39. The averaging circuits 38 and 39 calculate the respective averages of the block-encoded data and a block period reset signal is applied through a terminal 40 to the averaging circuits 38 and 39. The averaging circuit 38 provides the average MAX' of the input picture element data in the maximum level range of MAX to (MAX–$\Delta$) and the averaging circuit 39 provides the average MIN' of the input picture element data in the minimum level range of MIN to (MIN+$\Delta$). A subtracter 41 subtracts the average MIN' from the average MAX' to provide a corrected dynamic range DR'.

A subtracter 42 subtracts the average MIN' from the input data (supplied thereto through the time matching delay circuit 43) to eliminate the minimum value from the input data and provides data PD1. The data PD1 and the corrected dynamic range DR' are coupled to a quantizing circuit 44. The quantizing circuit 44 employed herein is a variable-length ADRC for edge-matching quantization, in which the number of bits allocated for quantization is 0 (code signal is not transferred), 1, 2, 3 or 4. The number n of bits to be allocated to a block is determined for each block by a bit number determining circuit 45 and the number n of allocated bits is supplied to the quantizing circuit 44.

The variable-length ADRC code allocates smaller numbers of bits to blocks of smaller dynamic ranges DR' and allocates larger numbers of bits to blocks of larger dynamic ranges DR' for efficient coding. No code signal is transferred (number of bits n=0) and only dynamic range data DR' is transferred for blocks having a dynamic range DR'<T1. The number of bits of the code signal that is transferred is dependent upon the value of the dynamic range DR' in accordance with the following relationships: n=1 for blocks having a dynamic range of T1$\leq$DR'<T2, n=2 for blocks having a dynamic range of T2$\leq$DR'<T3, n=3 for blocks having a dynamic range of T3$\leq$DR'<T4, and n=4 for blocks having a dynamic range of DR'$\geq$T4, where T1 to T4 are thresholds for determining the number of n bits to be allocated to blocks, described below.

The variable-length ADRC is capable of controlling, namely, buffering, the quantity of data in an ADRC-encoded block by varying the thresholds T1 to T4. Accordingly, the variable-length ADRC can be applied to a transfer circuit, such as the digital VTR employed herein, in which the quantity of data for each field or each frame is to be limited to a predetermined value.

A buffering circuit 46 for determining the threshold T1 to T4 for limiting the quantity of data in an ADRC-encoded block to no more than a predetermined value stores a plurality of threshold sets (T1, T2, T3, T4), for example, thirty-two sets, identified by parametric codes Pi (i=0,1, 2, . . . , and 31). The quantity of data to be produced decreases monotonically with an increase in the subscript "i" of the parametric code Pi. The picture quality of the picture ultimately reproduced from the ADRC data deteriorates as the quantity of data that is produced decreases.

A comparator 47 receives the thresholds T1 to T4 from the buffering circuit 46 and also receives the dynamic range data DR' from the substracter 41 through a delay circuit 48. The delay circuit 48 delays the application of the dynamic range data DR' to the comparator 47 for a time required to match the inherent time delay of the buffering circuit 46. The comparator 47 compares the dynamic range data DR' of each block to the thresholds. The output signal of the comparator 47 is supplied to the bit number determining circuit 45 to determine the number n of bits to be allocated to the block. The quantizing circuit 44 converts the data PD1 coupled thereto through a delay circuit 49 into a code signal DT by edge-matching quantization using the dynamic range DR' and the number n of the allocated bits. The quantizing circuit 44 is, for example, a ROM.

The modified dynamic range DR' and the average MIN' are coupled through the delay circuits 48 and 50, respectively, and code signal DT and the parametric code Pi indicating a selected threshold set also are provided for use by further circuitry. Since signals that are initially quantized by nonedge-matching quantization are quantized in quantizing circuit 44 by edge-matching quantization on the basis of the dynamic range data DR', deterioration of the quality of the picture reproduced from this data is minimized even when dubbing is used.

The channel encoder 11 and the channel decoder 15 shown in FIG. 7 now will be described.

Figure 12:
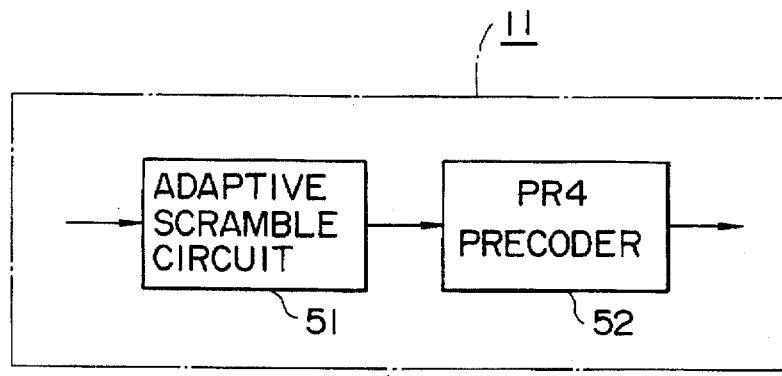
FIG. 12 is a block diagram of a channel encoder that may be used in FIG. 7.

Referring to FIG. 12, the channel encoder 11 is comprised of an adaptive scramble circuit 51 having a plurality of M-systems. The output signal of the parity generating circuit 10 is supplied to the adaptive scramble circuit 51 and the one M-system that provides an output signal having the least high-frequency component and the least dc component is selected. A partial response class 4 precoder 52 executes the calculation of $1/(1-D^2)$ (D represents a unit delay) on the data supplied thereto from the selected M-system scramble circuit. The output signals of the precoder 52 are amplified by the amplifiers 12A and 13A, and the amplified signals are recorded by the magnetic heads 13A and 13B.

Figure 13:
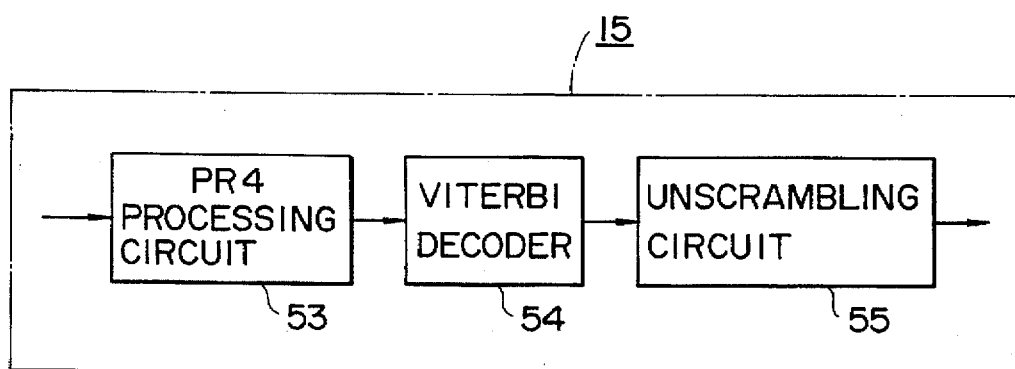
FIG. 13 is a block diagram of a channel decoder that may be used in FIG. 8.

Referring to FIG. 13, the channel decoder 15 of the reproducing circuit is provided with a partial response class 4 processing circuit 53 for processing the reproduced output signals that are amplified by the amplifiers 14A and 14B in accordance with the transfer function 1+D. A Viterbi decoding circuit 54, which is resistant to noise, decodes the output signals of the processing circuit 53 by using correlation and certainty of data, as is known, and an unscrambling circuit 55 unscrambles the data scrambled by the recording circuit to recover the original data. Block decoding by the Viterbi decoding circuit 54, as compared with bit decoding, improves the CN ratio by 3 dB.

Figure 14:
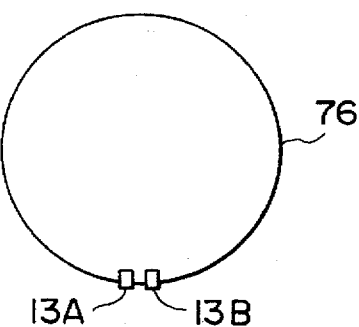
FIG. 14 is a plan view of the disposition of magnetic heads used for recording and reproducing in the digital VTR.

The magnetic heads 13A and 13B are combined in a magnetic head unit and the magnetic head unit is mounted on a rotary drum 76 as shown in FIG. 14. A magnetic tape, not shown, is wound helically around the rotary drum 76 at a contact angle of about 180°. The magnetic heads 13A and 13B scan the magnetic tape simultaneously. The respective recording gaps of the magnetic heads 13A and 13B are inclined in opposite directions to each other to reduce crosstalk between the adjacent tracks by relying on azimuth loss of the reproduced signals. For example, the gap of the magnetic head 13A is inclined at +20° relative to the direction of the width of tracks and the gap of the magnetic head 13B is inclined at −20° relative to that direction.

Figure 15:
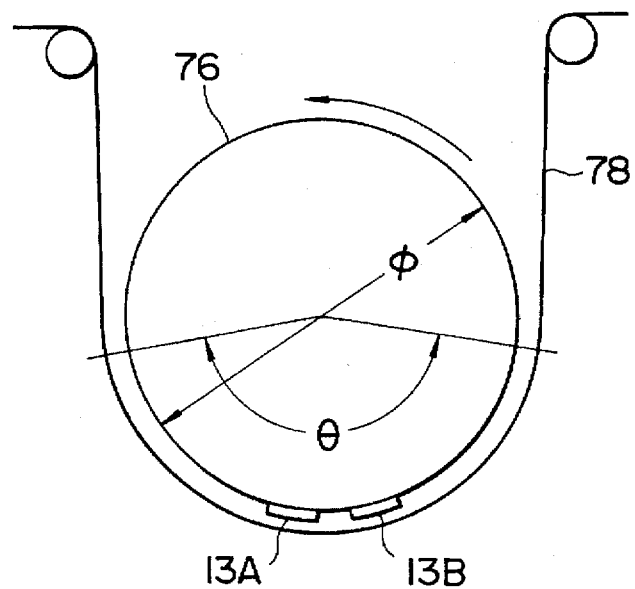
FIG. 15 is a plan view of a rotary head drum around which a magnetic tape is wound.
Figure 16:
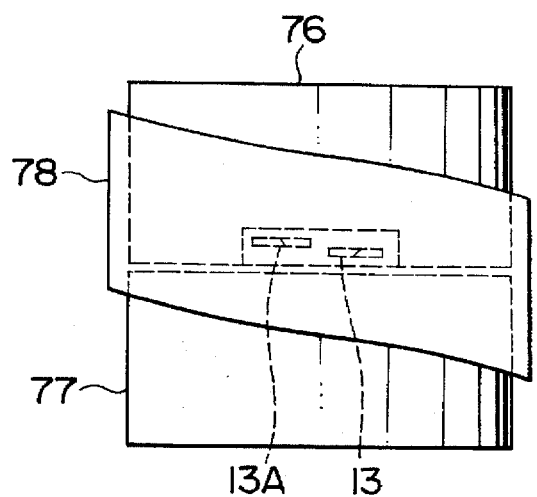
FIG. 16 is a front view of the rotary head drum of FIG. 15.

FIGS. 15 and 16 show more specifically the construction of a double azimuth magnetic recording/reproducing head constructed by mounting the magnetic heads 13A and 13B in combination in a magnetic head unit on an upper drum 76 which rotates at a high rotating speed relative to a fixed lower drum 77. The contact angle Θ of a magnetic tape 78 is 166° and the diameter of both the upper drum 76 and the lower drum 77 is 16.5 mm. Data representing one video field is recorded on five tracks of the magnetic tape 78. This segment system shortens the length of tracks and reduces errors attributable to a reduction in precise linearity of the tracks.

The double azimuth magnetic head unit, as compared with a magnetic head unit provided with a pair of magnetic heads disposed in a diametrically opposite arrangement, is capable of reducing errors attributable to non-linearity of the tracks and enables a more accurate pairing adjustment because the distance between the magnetic heads is small. Thus, the electromagnetic conversion system constructed in this manner is capable of recording data on and reproducing data from narrow tracks.

As is apparent from the foregoing description, a magnetic recording medium in accordance with the present invention comprises a nonmagnetic support, a magnetic metal thin film formed on the nonmagnetic support and a protective film of a corrosion-resistant metal formed over the magnetic metal thin film. The corrosion-resistant protective film suppresses the corrosion of the magnetic metal thin film and reduces bit error rate greatly. Accordingly, compressed digital video signals can be recorded satisfactorily without significant reproducing distortion.

In one embodiment, the protective film is comprised of a multilayer laminate protective film consisting of a corrosion-resistant protective film and a durable protective film formed of a hard material. Accordingly, the magnetic recording medium has improved corrosion resistance and high durability.

In one method of fabricating the magnetic recording medium in accordance with the present invention, the magnetic metal thin film is formed on one major surface of the nonmagnetic support by a sputtering process and then the nonmagnetic support carrying the magnetic metal film travels along the circumference of a cooling cylinder whereat the multilayer protective film is formed by depositing atoms sputtered from a target(s) of a durable material or from a composite target consisting of a corrosion-resistant metal and a durable material. This method can be carried out without requiring any modification of an existing manufacturing line, enables the manufacturing line to operate at a high productivity and is of high industrial utility.

Although the invention has been described in its preferred forms with a certain degree of particularity, obviously many changes and variations are possible therein. It is therefore to be understood that the present invention may be practiced otherwise than as specifically described herein without departing from the spirit and scope thereof.

TABLE 1

| Corrosion-resistant film | $\Delta Ms_1$ (%) | $\Delta Ms_2$ (%) |
|---|---|---|
| None | −6 | −12 |
| $Co_{50}Ni_{40}$ | −4 | −9 |
| $Co_{30}Ni_{20}$ | −5 | −11 |
| Ni | −2 | −3 |
| Cr | −2 | −5 |

TABLE 2

| Thickness (Å) | $\Delta Ms_2$ (%) | Reproduced output (db) | Error rate |
|---|---|---|---|
| 100 | −3.8 | −1.1 | $6 \times 10^{-5}$ |
| 150 | −3.0 | −1.6 | $6 \times 10^{-5}$ |
| 200 | −2.5 | −2.2 | $7 \times 10^{-5}$ |
| 300 | −1.0 | −3.5 | $8 \times 10^{-5}$ |

TABLE 3

| Protective film Upper layer | Protective film Lower layer | Still mode endurance time (hr) | Corrosion resistance Surface condition | $\Delta Ms_2$ (%) | Error rate |
|---|---|---|---|---|---|
| — | — | 2 | Δ | −15 | $5 \times 10^{-4}$ |
| Carbon | — | >10 | Δ | −16 | $7 \times 10^{-4}$ |
| $SiO_2$ | — | 10 | Δ | −12 | $2 \times 10^{-4}$ |
| — | Ni | 0.5 | ⊚ | −3 | $4 \times 10^{-5}$ |
| — | Cr | 0.5 | ○ | −5 | $8 \times 10^{-5}$ |
| $SiO_2$ | Ni | 8 | ⊚ | −4 | $4 \times 10^{-5}$ |
| Carbon | Ni | >10 | ⊚ | −4 | $4 \times 10^{-5}$ |
| Carbon | Cr | >10 | ○ | −9 | $9 \times 10^{-5}$ |

TABLE 4

| Upper protective film (15 mm) | Lower protective film (15 mm) | Corrosion resistance $\Delta Ms_3$ | Still mode endurance (hr) |
|---|---|---|---|
| Carbon | — | −21 | >10 |
| $SiO_2$ | — | −26 | >10 |
| — | Cu | −2.1 | .01 |
| — | Cr | −3.4 | 0.5 |
| Carbon | Cu | −2.0 | >10 |
| " | Cr | −3.3 | >10 |
| " | Zr | −4.1 | >10 |
| " | Zn | −2.4 | >10 |
| $SiO_2$ | Cu | −2.3 | >10 |
| " | Cr | −3.7 | >10 |
| " | Zr | −4.3 | >10 |
| " | Zn | −2.5 | >10 |
| — | — | −40 | 2 |

TABLE 5

| Thickness (Å) Carbon | Thickness (Å) Ni | Still mode endurance time (hr) | $\Delta Ms_2$ (%) |
|---|---|---|---|
| 15 | 50 | 4 | −7.3 |
| 20 | 50 | 7 | −7.1 |
| 50 | 50 | >10 | −7.0 |
| 50 | 150 | >10 | −4.0 |
| 50 | 300 | >10 | −2.2 |
| 100 | 50 | >10 | −6.8 |
| 100 | 100 | >10 | −5.0 |
| 100 | 150 | >10 | −3.8 |
| 100 | 300 | >10 | −2.1 |
| 150 | 50 | >10 | −6.8 |
| 150 | 100 | >10 | −4.8 |
| 150 | 150 | >10 | −3.6 |
| 150 | 300 | >10 | −1.9 |
| 300 | 50 | >10 | −6.7 |
| 300 | 100 | >10 | −4.8 |
| 300 | 150 | >10 | −3.6 |

TABLE 6

| Upper protective film carbon (nm) | Lower protective film (Cu) (nm) | Thickness protective film (nm) | Corrosion of resistance $\Delta Ms_3$ (%) | Still mode endurance | Reproduced output (dB) | Initial error rate |
|---|---|---|---|---|---|---|
| — | — | 0 | −40 | 2 | 0 | $3 \times 10^{-5}$ |
| 15 | 2 | 17 | −31 | >10 | −2.2 | $7 \times 10^{-5}$ |
| 20 | 32 | 52 | −0.6 | >10 | −6.7 | $1 \times 10^{-4}$ |
| 1.5 | 10 | 11.5 | −2.0 | −4 | −1.5 | $6 \times 10^{-5}$ |
| 15 | 3 | 18 | −18 | >10 | −2.3 | $7 \times 10^{-5}$ |
| 15 | 5 | 20 | −12 | >10 | −2.5 | $7 \times 10^{-5}$ |
| 15 | 10 | 25 | −2.4 | >10 | −3.2 | $8 \times 10^{-5}$ |
| 46 | 3 | 49 | −16 | >10 | −5.8 | $1 \times 10^{-4}$ |
| 10 | 3 | 13 | −19 | >10 | −1.7 | $6 \times 10^{-5}$ |
| 10 | 10 | 20 | −2.1 | >10 | −2.6 | $7 \times 10^{-5}$ |
| 10 | 20 | 30 | −0.8 | >10 | −3.8 | $8 \times 10^{-5}$ |
| 2 | 10 | 12 | −2.6 | 7 | −1.6 | $6 \times 10^{-5}$ |
| 2 | 46 | 48 | −0.1 | 8 | −5.8 | $1 \times 10^{-4}$ |
| 2 | 3 | 5 | −19 | 7 | −0.6 | $4 \times 10^{-5}$ |
| 1.5 | 2 | 3.5 | −34 | 3 | −0.4 | $4 \times 10^{-5}$ |

TABLE 7

| | Target 128a | Target 128b | Target 128c | Still mode endurance time (hr) | $\Delta Br$ (%) | Shuttle test (db) |
|---|---|---|---|---|---|---|
| Comparative example 1 | Carbon | Carbon | Carbon | 24≦ | 15.0 | −4.2 |
| Example 1 | Carbon | Chromium | Carbon | 24≦ | 4.1 | −1.8 |
| 2 | Composite | Composite | Carbon | 24≦ | 2.6 | −1.6 |

What is claimed is:

1. A magnetic recording medium comprising:
   a nonmagnetic support;
   a magnetic metal thin film formed on the nonmagnetic support; and
   a multilayer laminate protective film formed over the magnetic metal thin film, said multilayer laminate protective film having an overall thickness in the range of 50 to 500 Å and consisting essentially of a plurality of alternating layers of a corrosion-resistant protective film comprised of a corrosion-resistant metal and a durable protective film comprised of a hard material, said multilayer laminate protective film having at least three layers arranged such that said magnetic recording medium has an error rate of less than $1\times10^{-4}$ and a reproduced output level of greater than $-6.7$ dB.

2. A magnetic recording medium comprising:

a nonmagnetic support;

a magnetic metal thin film formed on the nonmagnetic support; and a multilayer laminate protective film formed over the magnetic metal thin film and consisting essentially of a plurality of alternating layers of corrosion-resistant protective film comprised of a corrosion-resistant metal and durable protective film comprised of a hard material, said multilayer laminate protective film having an overall thickness of at most 500 Å and having at least three layers arranged such that the multilayer laminate protective film has a corrosion resistance defined by a remanent magnetic flux density change $\Delta Br$ of less than 15%.

3. A magnetic recording medium according to claim 2, wherein a layer of the durable protective film is an uppermost layer of the multilayer laminate protective film.

4. A magnetic recording medium according to claim 2, wherein the multilayer laminate protective film has an overall thickness in the range of 50 to 500 Å.

5. A magnetic recording medium according to claim 2, wherein the durable protective film has a thickness in the range of 20 to 470 Å.

6. A magnetic recording medium according to claim 2, wherein said corrosion-resistant metal includes at least one metal selected from the group consisting of Cr, Cu, Ni, W, Ta, Mo, Zn, Zr, Pt, V, Au, In, Al, Sn, Pb, Cr-Ti alloy, Cr-Zr alloy, Cr-Nb alloy, Cr-Ta alloy, Cr-Al alloy, Cr-Zn alloy, Cr-Ni alloy and Ni-Mo-Cr-Fe alloy.

7. A magnetic recording medium according to claim 2, wherein the hard material is selected from the group consisting of $SiO_2$, $Si_3N_4$, $SiN_x$, BN, $ZrO_2$, $Al_2O_3$, $MoS_2$, TiN, SiC, carbon, $TiO_2$ and TiC.

8. A magnetic recording medium according to claim 1, wherein the durable protective film is an uppermost layer of the multilayer laminate protective film.

9. A magnetic recording medium according to claim 1, wherein the durable protective film has a thickness in the range of 20 to 470 Å.

10. A magnetic recording medium according to claim 1, wherein said corrosion-resistant metal includes at least one metal selected from the group consisting of Cr, Cu, Ni, W, Ta, Mo, Zn, Zr, Pt, V, Au, In, Al, Sn, Pb, Cr-Ti alloy, Cr-Zr alloy, Cr-Nb alloy, Cr-Ta alloy, Cr-Al alloy, Cr-Zn alloy, Cr-Ni alloy and Ni-Mo-Cr-Fe alloy.

11. A magnetic recording medium according to claim 1, wherein the hard material is selected from the group consisting of $SiO_2$, $Si_3N_4$, $SiN_x$, BN, $ZrO_2$, $Al_2O_3$, $MoS_2$, TiN, SiC, carbon, $TiO_2$ and TiC.

12. A magnetic recording medium according to claim 1, wherein there is a distinct interface separating the layers of corrosion-resistant protective film and durable protective film.

13. A magnetic recording medium according to claim 1, wherein there is an interface between the layers of corrosion-resistant protective film and durable protective film and the interface is comprised of a mixture of the corrosion-resistant metal and the hard material.

14. A magnetic recording medium according to claim 2, wherein there is a distinct interface separating the layers of corrosion-resistant protective film and durable protective film.

15. A magnetic recording medium according to claim 2, wherein there is an interface between the layers of corrosion-resistant protective film and durable protective film and the interface is comprised of a mixture of the corrosion-resistant metal and the hard material.

16. A magnetic recording medium according to claim 1, wherein the multilayer laminate protective film has a corrosion resistance defined by a saturation magnetization change ratio $\Delta Ms$ greater than $-34\%$.

17. A magnetic recording medium according to claim 1, wherein the multilayer laminate protective film has a still mode endurance of at least 5 hours.

18. A magnetic recording medium according to claim 1, wherein the multilayer laminate protective film is formed by moving said nonmagnetic support along a circumference of a cooling cylinder and sputtering successive layers of said corrosion-resistant metal and said hard material onto said magnetic metal thin film from at least one target of said corrosion-resistant metal and from at least one target of said hard material, the targets being disposed around the cooling cylinder.

19. A magnetic recording medium according to claim 1, wherein the multilayer laminate protective film is formed by moving said nonmagnetic support along a circumference of a cooling cylinder and sputtering successive layers of said corrosion-resistant metal and said hard material onto said magnetic metal thin film from at least one composite target comprised of said corrosion-resistant metal and said hard material, the target being disposed near the cooling cylinder.

20. A magnetic recording medium according to claim 1, wherein the magnetic recording medium is a magnetic tape.

21. A magnetic recording medium comprising:

a nonmagnetic support;

a magnetic metal thin film formed on the nonmagnetic support; and a multilayer laminate protective film formed over the magnetic metal thin film and consisting essentially of a plurality of alternating layers of corrosion-resistant protective film comprised of a corrosion-resistant metal and durable protective film comprised of a hard material, said multilayer laminate protective film having an overall thickness of at most 500 Å and having at least three layers arranged such that the multilayer laminate protective film has a sliding property defined by a shuttle test output level difference of greater than $-4.2$ dB.

22. A magnetic recording medium according to claim 18, wherein the multilayer laminate protective film is formed by RF sputtering at a supply power substantially equal to 300 W in an atmosphere comprised of Ar at a pressure substantially equal to $3\times10^{-3}$ Torr.

23. A magnetic recording medium according to claim 18, wherein the multilayer laminate protective film is formed by sputtering in an atmosphere comprised of Ar at a pressure substantially equal to 2 Pa.

24. A magnetic recording medium according to claim 19, wherein the multilayer laminate protective film is formed by sputtering in an atmosphere comprised of Ar at a pressure substantially equal to 2 Pa.

* * * * *